May 15, 1962  F. BROOMHEAD ETAL  3,034,774
DEBONDING OF RUBBER FROM METAL
Filed April 23, 1957  2 Sheets-Sheet 1
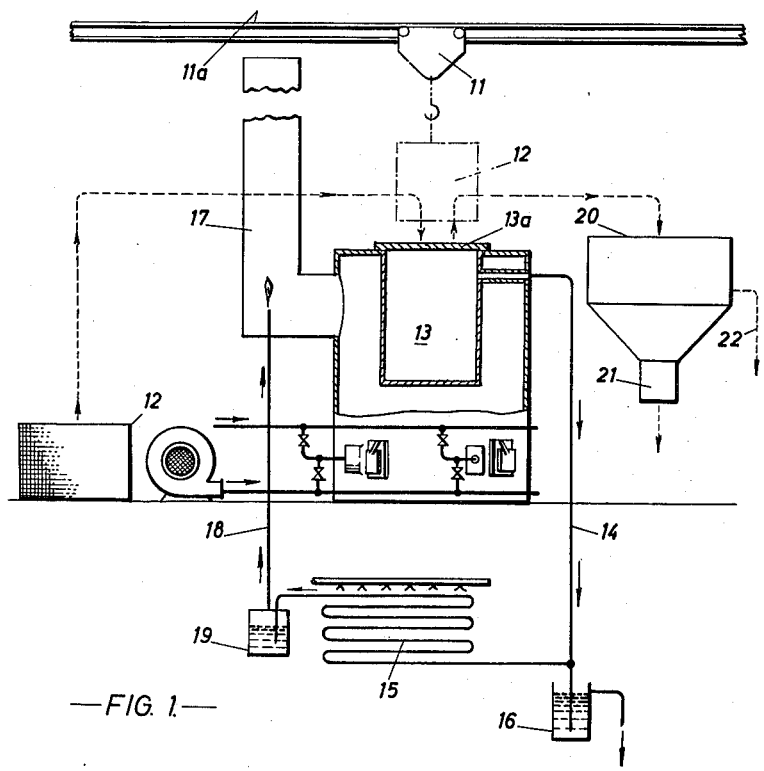
—FIG. 1.—
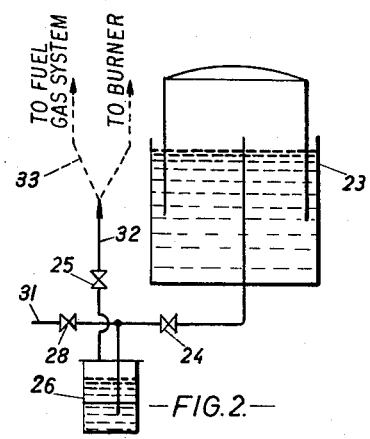
—FIG. 2.—
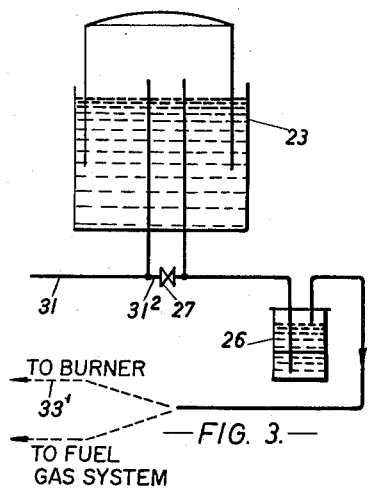
—FIG. 3.—

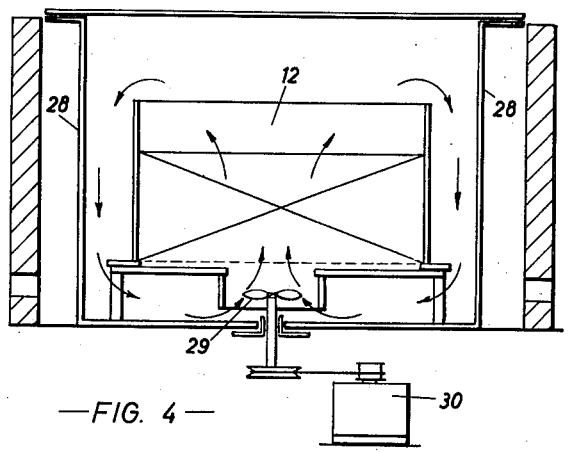
—FIG. 4—
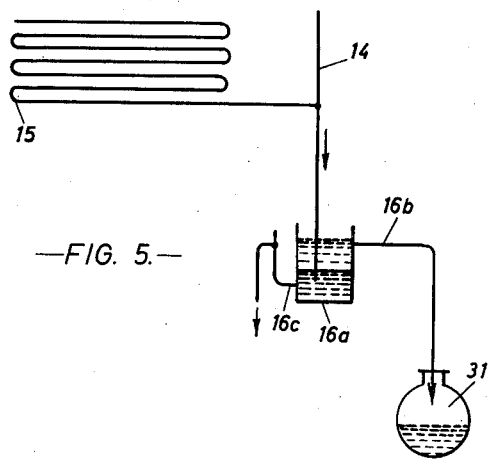
—FIG. 5.—

3,034,774
DEBONDING OF RUBBER FROM METAL
Frank Broomhead, Dorking, and James Joshua Priestley, Huddersfield, England, assignors of one-fourth to W. C. Holmes & Co., Limited, Huddersfield, England, and one-fourth to Andre Rubber Company Limited, Surbiton, England, both British companies
Filed Apr. 23, 1957, Ser. No. 654,548
Claims priority, application Great Britain Apr. 28, 1956
4 Claims. (Cl. 263—2)

The present invention concerns the debonding of rubber from metal, or the disposal of scrap rubber from cables and the like to recover valuable metals such as copper.

When it is desired to recover a metal component from a waste article composed of a rubber component bonded to such metal component, it has previously been customary to remove the bulk of the rubber by cutting with knives, the firmly attached remaining relatively thin layer being removed either by open ignition, or by heating to cause melting, followed by a surface cleaning treatment. The first of these known methods produces obnoxious smoke and may lead to embrittlement by carbonization, distortion of metal parts due to lack of uniformity of heat treatment, overheating, etc., and surface pitting and corrosion due to sulphur dioxide during burning. The second known method is slow and expensive, with corrosion problems attendant upon the action of chlorine-containing solvents.

It is therefore, one object of the present invention to provide a debonding process which avoids the aforementioned disadvantages.

A further object of the invention is to provide a process for debonding rubber from metal in which the components are heated in the absence of oxygen to a moderate temperature whereby the rubber is decomposed into vapours and a carbon residue is left on the metal surface. The carbon residue may subsequently be detached by any known method and the metal components are then ready for re-use. By the term "moderate temperature" is to be understood a temperature and duration thereof which is such that no damage is caused to tempered metal parts.

Another object of the invention is to provide an apparatus for debonding rubber from metal comprising a closable furnace from which oxygen is excludable and a means for drawing off the products of carbonization. A small gas holder, for example 50 cu. ft. capacity and of the conventional floating bell design, may be included in the system to receive all or part of the gas evolved during the carbonization.

With these and other objects in view which will become apparent in the following detailed description, the present invention will be clearly understood in connection with the accompanying drawings, in which:

FIGURE 1 is a diagram of an apparatus for debonding rubber from metal constructed in accordance with the present invention;

FIG. 2 is a diagram of one form of gas holder which may be inserted into the system shown in FIG. 1;

FIG. 3 is a diagram of an alternative form of gas holder insertable into the system shown in FIG. 1;

FIG. 4 is a diagram showing an alternative form of gas fired furnace which may be included in the apparatus shown in FIG. 1; and FIG. 5 is a diagram showing a tar-water separator which may be included in the apparatus shown in FIG. 1.

Referring now to the drawings, and in particular to FIG. 1, a travelling block 11 is adapted to move on a gantry 11a for the purpose of transporting a basket 12, for rubber bonded metal parts, from ground level into a gas fired furnace 13 and out again therefrom. The furnace 13 is fired as indicated in the drawing in a conventional manner from below such as by tangentially directed gas jets and is provided with a removable cover 13a.

A cooler 15, connected to the furnace 13 by a duct 14, is provided for cooling the products of carbonization which comprise gas and tar. A storage tank 16 is provided, into which cooled tar can be drained. A duct 18, for the passage of cooled carbonization gases, leads to a furnace flue 17 and is provided with a burner disposed in the latter. A safety seal 19 is interposed between the cooler 15 and the duct 18.

A screen 20 is provided for the separation of carbon from the metal parts which have been treated; a discharge means 21 for the carbon is arranged below the screen 20.

The rubber bonded metal parts are loaded into the basket 12, at ground level and transported by means of the travelling block 11 into the furnace 13. The cover 13a is firmly clamped to the furnace 13 which is heated to a working temperature of approximately 450° C., air being rigorously excluded, during which period the rubber is carbonized evolving gas and tar, leaving a friable mass of carbon adhering to the metal components. The tar and gas pass to the cooler 15, after which the tar passes to the storage tank 16 and the gases pass, by way of the duct 18 to the furnace flue 17 where they are burnt. This is brought about in such manner that the hot carbonization gas leaves the furnace 13 by way of the duct 14 and in doing so, looses heat to the atmosphere so that liquid tar is condensed and drained into the storage tank 16. As the drain into the storage tank 16 is sealed in the content thereof, the remaining tarry vapor and gas are forced to flow through the cooler 15, where condensation is completed. The condensed tar drains back along the duct 14 in countercurrent to the gas and tarry vapor into the storage tank 16. There is a valve which takes the form of a liquid seal, actually in the tank 16 itself, and this prevents gas passing into the tank although the inflow of liquid tar, as it is desired.

After the heating process, the basket 12, containing the metal parts, is removed, the metal parts are placed over the screen 20 for the removal of surplus carbon which is discharged at 21 and the metal parts are passed via the outlet 22 to a rotating barrel containing soft stone composition chips in a solution, for removal of any carbon traces remaining on the metal surface. This is achieved in such manner that the screen 20 is an inclined cylindrical screen positioned over a hopper. The carbonized parts are discharged by overturning the work container into the upper end of the rotating screen, and as the parts gravitate to the lower discharge end, the carbon particles fall through the perforations into the hopper for easy disposal. It is to be understood, however, that a vibrating screen could be used for the same purpose.

If necessary the furnace 13 can be filled with an oxygen free gas, such as nitrogen or steam. The furnace 13 may be fired by other means than gas, for example oil.

A gas holder of the conventional floating bell design may be inserted in the system. This can receive all or part of the gas evolved during the carbonization of the rubber-bonded metal components.

The gas holder 23 and the arrangement shown in FIG. 2 of the drawings, would replace the safety pot 19 shown in FIG. 1. With the valve 24 open and the valve 25 closed, vapor from the cooler 15 would flow into the gas holder 23. With valve 24 closed and valve 25 open, vapor would flow through the safety pot 26 and on through duct 32 to either a burner or to the fuel gas system of the furnace through duct 33. When vapor is not being made in the furnace, valve 28 is closed and valves 24 and 25 are opened, whereupon gas will flow through duct 31 via the safety pot 26 and duct 32 to the burner, the fuel system not then being in use.

When a gas holder 23, shown in FIG. 2 is used, some of the gas evolved is allowed to pass thereinto by opening a cock 24 and closing a cock 25 which leads to a burner; a safety pot 26 is connected in the duct prior to the cock 24. When the holder 23 is nearly full it is isolated by reversing the position of the cocks. At the end of the run, when the main fuel burners are shut off there is a small and diminishing evolution of gas from the charge, which eventually ceases, after which the static gas in the furnace contracts by cooling. Instead of allowing an undesirable vacuum to be created in the furnace, the two cocks are re-set, 24 opened and 25 closed, so that gas may "breathte" back into the furnace from the holder. When the furnace is cool enough, cock 24 is shut off and the furnace opened up. The retort is that part of the furnace which is made closable by means of the movable cover 13a in FIG. 1 to exclude air, and is surrounded by the combustion chamber into which the fuel gas burners fire.

When the gas holder 23 shown in FIG. 3 is used, all the gas passes through a duct 31' into the holder 23 or through a by-pass $31^2$ around the holder 23, a cock 27 being provided for effecting these alternatives. The gas which passes through the by-pass $31^2$ and the safety pot 26 can be passed to a special burner or through the duct 33' to the fuel gas system. As a measure of heat economy it has been found practicable to pass this gas to the fuel gas system and mix it with the fuel gas instead of to the burner. The total heating value of the gas evolved during carbonization is about 10% of the total heat required to operate the process.

This by-pass is shown in FIG. 3 and carries the by-pass valve 27. The gas holder 23' has separate inlet and outlet gas connections, each of which would be fitted with an isolating valve, which is not shown but known as common practice. Normal operation would involve the by-pass valve 27 closed, and inlet and outlet valves open, so that the gas evolved from the rubber treatment would have to pass through the gas holder 23, where beneficial mixing with the holder contents would result, before flowing to the disposal burner or to the fuel gas system. To insure an adequate holder stock, the holder outlet valve and by-pass 27 would remain shut and the gas evolved would flow into the holder through the duct 31' and further inflate it. If the holder stock is considered adequate, then the by-pass valve 27 would be open, the gas flowing through the duct 31', holder inlet and outlet valves would be closed, thus allowing the gas evolved in the furnace 13 to flow to one or other burner system through duct 33' without hindrance. In any event, from time to time the by-pass valve 27 would be opened, to allow any condensate trapped by it to flow into the safety pot 26. The safety pot 26 functions as a liquid non-return valve, and as a means of discharging safely, that is without loss of gas to atmosphere, all surplus liquid condensate. It is required as a non-return valve to prevent any air being drawn in through the disposal burner back into the furnace 13, should vacuum conditions therein ever develop.

As a further measure of heat economy the use of the tar collected during carbonization as a fuel for later batches of work has been investigated. This corresponds roughly in quality with a light fuel oil and as an example, if the work charged into the pot consists of 25% rubber, the tar produced can provide nearly 80% of the heat required to operate the process. It is evisaged that a plant could be operated on tar, with gas or a fuel oil for topping up the heat requirements.

A further measure of heat economy with or without those already described is shown in FIG. 4. The rate of heat transfer from the heated pot walls 28 to the charge in the basket 12 is improved by using forced recycling of the carbonization gases by a fan 29 operated by a motor 30.

A tar/water separator 16a (FIG. 5) may be included in the tar handling system instead of the storage tank 16. The tar is run off automatically from a tar overflow 16b to a storage tank 31 and the water is run off at 16c.

One experimental result of a full scale trial on this apparatus is shown below:

Total weight of components treated_____pounds__ 1097
Weight of metal in components_____do____ 823
Weight of rubber in components_____do____ 274
Weight of carbon residue_____do____ 84
Tar and water distillate collected_____gallons__ 15.5
Maximum temperatures:
  (a) Gas offtake_____°C__ 302
  (b) Heating flues_____°C__ 498
Time of treatment:
  (a) Heating up_____hours__ 2
  (b) At temperature_____do____ 7

The metal components recovered were satisfactory for re-use and almost as new, none being scrapped. No smoke was produced at the special carbonization gas burner.

While we have disclosed several embodiments of the present invention, it is to be understood that these embodiments are given by example only and not in a limiting sense, the scope of the present invention being determined by the objects and the claims.

We claim:

1. A debonding apparatus for the removal of rubber from rubber bonded metal parts comprising a furnace closable against the atmosphere and receiving said parts, means for inserting into and removing from, respectively, said parts from said furnace, a first duct leading from said furnace for drawing off the tar and vapors produced by carbonization of said rubber and separating means connected with said first duct for separating said tar from said vapors, a gas holder receiving at least a part of the vapors issuing from said separating means, a second duct connecting said separating means with said gas holder, a safety pot, a third duct connecting said gas holder with said safety pot, by-pass means disposed directly between said second and third ducts thereby directly connecting said separating means with said safety pot, a burner for burning said vapors, a fourth duct connecting said safety pot with said burner, and a fuel gas system connected with said furnace and leading to the fuel gas system of said furnace.

2. The debonding apparatus as set forth in claim 1, which includes a fifth duct connecting said safety pot with said fuel gas system of said furnace.

3. A debonding apparatus for the removal of rubber from rubber bonded metal parts comprising a furnace closable against the atmosphere and receiving said parts, means for inserting into and removing from, respectively, said parts from said furnace, a first duct leading from said furnace for drawing off the tar and vapors produced by carbonization of said rubber and separating means connected with said first duct for separating said tar from said vapors, a gas holder receiving at least a part of the vapors issuing from said separating means, a second duct connecting said separating means with said gas holder, a safety pot, and a third duct connecting said gas holder and said separating means with the said safety pot, a burner for burning said vapors, a fourth duct connecting said safety pot with said burner, and a fuel gas system connected with said furnace and leading to the fuel gas system of said furnace.

4. The debonding apparatus as set forth in claim 3, which includes a fifth duct connecting said safety pot with said fuel gas system of said furnace.

(References on following page)

References Cited in the file of this patent

UNITED STATES PATENTS

| | | |
|---|---|---|
| 522,357 | Sternberg | July 3, 1894 |
| 600,221 | Grey | Mar. 8, 1898 |
| 621,616 | Parks | Mar. 21, 1899 |
| 1,090,813 | Congdon | Mar. 17, 1914 |
| 1,532,789 | Vollrath | Apr. 7, 1925 |
| 1,721,840 | Smith | July 23, 1929 |
| 1,940,948 | Harsch | Dec. 26, 1933 |
| 2,004,796 | Payne | June 11, 1935 |
| 2,141,049 | Skeen | Dec. 20, 1938 |
| 2,184,671 | Hollander | Dec. 26, 1939 |
| 2,288,980 | Turin | July 7, 1942 |
| 2,412,758 | Smith | Dec. 17, 1946 |
| 2,432,868 | Earle et al. | Dec. 16, 1947 |
| 2,443,373 | Borsoff | June 15, 1948 |
| 2,571,328 | Baker | Oct. 16, 1951 |
| 2,658,742 | Suter et al. | Nov. 10, 1953 |